United States Patent
Araki et al.

(10) Patent No.: US 7,918,185 B2
(45) Date of Patent: Apr. 5, 2011

(54) ANIMAL-HERD MANAGEMENT USING DISTRIBUTED SENSOR NETWORKS

(75) Inventors: M. Sam Araki, Saratoga, CA (US);
Peter Coe-Verbica, Santa Cruz, CA (US); Ashim Banerjee, Westminster, CO (US); Safwan Shah, San Jose, CA (US); Mobeen Bajwa, Fremont, CA (US)

(73) Assignee: ST-Infonox, Sunnyvale, CA (US)

( * ) Notice: Subject to any disclaimer, the term of this patent is extended or adjusted under 35 U.S.C. 154(b) by 381 days.

(21) Appl. No.: 11/468,111

(22) Filed: Aug. 29, 2006

(65) Prior Publication Data

US 2007/0044732 A1 Mar. 1, 2007

Related U.S. Application Data

(60) Provisional application No. 60/712,722, filed on Aug. 29, 2005.

(51) Int. Cl.
*G08B 23/00* (2006.01)
(52) U.S. Cl. ...................................... 119/174; 340/573.3
(58) Field of Classification Search .................. 119/712, 119/719–721, 840, 908, 174; 340/573.3, 340/573.2
See application file for complete search history.

(56) References Cited

U.S. PATENT DOCUMENTS

| | | | | |
|---|---|---|---|---|
| 5,791,294 A * | 8/1998 | Manning | ........................ | 119/721 |
| 5,959,568 A * | 9/1999 | Woolley | ........................... | 342/42 |
| 6,967,563 B2 * | 11/2005 | Bormaster | ................. | 340/10.31 |
| 7,136,782 B1 * | 11/2006 | Araki et al. | ................... | 702/188 |
| 7,196,628 B2 * | 3/2007 | Hixson | ....................... | 340/573.1 |
| 7,397,379 B2 * | 7/2008 | Richards et al. | ........... | 340/573.1 |
| 7,545,281 B2 * | 6/2009 | Richards et al. | ........... | 340/573.1 |
| 2004/0135693 A1 * | 7/2004 | Schubert et al. | ........... | 340/573.1 |
| 2005/0081797 A1 * | 4/2005 | Laitinen et al. | ............... | 119/720 |
| 2005/0251339 A1 * | 11/2005 | Araki et al. | ....................... | 702/2 |
| 2005/0265272 A1 * | 12/2005 | Thorstensen et al. | ......... | 370/315 |
| 2006/0180093 A1 * | 8/2006 | Cross et al. | ................... | 119/720 |
| 2006/0220796 A1 * | 10/2006 | Pinter et al. | ............... | 340/286.02 |
| 2007/0008150 A1 * | 1/2007 | Hassell | ....................... | 340/573.1 |
| 2007/0204802 A1 * | 9/2007 | Davies | ......................... | 119/712 |
| 2007/0266959 A1 * | 11/2007 | Brooks | ........................ | 119/720 |

* cited by examiner

*Primary Examiner* — Rob Swiatek
*Assistant Examiner* — Kristen C Hayes
(74) *Attorney, Agent, or Firm* — Kilpatrick Townsend & Stockton LLP

(57) ABSTRACT

Methods and systems are provided for monitoring a herd of animals. Each of multiple sensors are attached to one of the animals and is in peer-to-peer communication with another of the sensors to define a dynamically network arrangement of sensors. A base station is in communication with at least one of the sensors to access the networked arrangement of sensors. A central system is in communication with the base station and has instructions to monitor a position of the herd with data collected by the sensors.

23 Claims, 6 Drawing Sheets

ANIMAL-HERD MANAGEMENT USING DISTRIBUTED SENSOR NETWORKS

CROSS REFERENCE TO RELATED APPLICATION

This application is a nonprovisional of, and claims the benefit of the filing date of, U.S. Prov. Pat. Appl. No. 60/712,722, entitled "ANIMAL-HERD MANAGEMENT USING DISTRIBUTED SENSOR NETWORKS," filed Aug. 29, 2005 by Sam Araki et al., the entire disclosure of which is incorporated herein by reference for all purposes.

BACKGROUND OF THE INVENTION

This application relates generally to management of animal herds. More specifically, this application relates to management of animal herds using distributed sensor networks.

Modern livestock operations require sophisticated techniques to manage the livestock efficiently. In managing a herd of animals, which may be raised to provide meat, milk, or other commercial products, it is generally necessary to use techniques to monitor the status of the herd and of individual animals within the herd on an on-going basis. This is true for relatively simple functions, such as inventory functions, in which the location of each animal being raised is known and monitored, but is also true for more sophisticated functions. For example, modern livestock operations spend considerable effort to ensure that animal reproduction is performed between animals having desirable combinations of genetic characteristics. The coordination of such reproduction involves at least two components: first, it is necessary to maintain pedigree information for each animal so that the desired genetic characteristics can be tracked; second, it is necessary to identify reproductive cycles of female animals so that the timing of reproduction may be coordinated.

The current state of the art in livestock management is deficient in some respects. For example, some inventory functions currently use radio-frequency identification ("RFID") tags that are affixed to an animal, often to the animals ear, and provide a signal that uniquely identifies the animal. To check the inventory, the animals are routed through a turnstile, allowing each RFID tag to be read by a reader local to the turnstile, with the identification being provided from the RFID tag being used to identify the particular animal from a database, and thereby verify its presence in the herd.

Such a technique requires human involvement in rounding up the animals and routing them through the turnstile. But perhaps even more significant is the fact that performing an inventory function in this way is very discrete, providing information only at the time the inventory check is made. Such discrete sampling is also evident in other aspects of current livestock management techniques, such as health monitoring. Current techniques periodically check the health of animals, but do not generally provide any simple way of identifying health issues as they occur, whether those health issues be negative issues like potential illnesses or positive issues like entering a state of estrus.

The need for improved real-time livestock management capabilities is thus felt in the art. In recent years, this need has become more acute as new diseases like bovine spongiform encephalitis have devastated cattle stocks. An ability to identify potential health issues early and to take remedial steps could mitigate the impact of this and other emerging diseases. Furthermore, there has recently been greater recognition that deliberate interference with animal stocks might be used by terrorist groups as a technique for interfering with food distribution. The increased recognition of a need in the art for improved real-time livestock management capabilities is also felt in this way.

BRIEF SUMMARY OF THE INVENTION

Embodiments of the invention thus provide methods and systems for monitoring a herd of animals. Each of a plurality of sensors are attached to one of the animals and is in peer-to-peer communication with another of the sensors to define a dynamically network arrangement of sensors. A base station is in communication with at least one of the sensors to access the networked arrangement of sensors. A central system is in communication with the base station and has instructions to monitor a position of the herd with data collected by the sensors.

The programming instructions to monitor the position of the herd may comprise programming instructions to determine an average position of the herd, such as by determining a mean position of the animals. In some instances, the programming instructions to monitor the position of the herd may further comprise programming instructions to determine a variance of the position of the animals. In one embodiment, the central system further has programming instructions to identify that one or more of the animals has separated from the herd.

In some embodiments, at least some of the sensors include a temperature detector, with the central system further having programming instructions to monitor temperatures of at least some of the animals with data collected by the sensors. In other embodiments, at least some of the sensors include a pressure detector, with the central system further having programming instructions to identify one or more of the animals having pressure exerted on them.

Multiple sensors may be attached to at least some of the animals. In some instances, at least one of the sensors may be attached subcutaneously to one of the animals. At least one of the sensors may also conveniently comprise a vibration power source to supply energy to the at least one of the sensors by extracting energy from motion of the animal to which the at least one of the sensors is attached.

Multiple herds may be monitored. In such embodiments, each of a second plurality of sensors is attached to one of the animals of a second herd of animals and is in peer-to-peer communication with another of the second plurality of sensors to define a second dynamically networked arrangement of sensors. A second base station is in communication with at least one of the second plurality of sensors to access the second dynamically networked arrangement of sensors. The central system further has programming instructions to monitor a position of the second of the herds with data collected by the second plurality of sensors.

In different embodiments, the herd of animals might comprise a domesticated livestock herd or might comprise a wildlife herd.

BRIEF DESCRIPTION OF THE DRAWINGS

A further understanding of the nature and advantages of the present invention may be realized by reference to the remaining portions of the specification and the drawings wherein like reference labels are used throughout the several drawings to refer to similar components. In some instances, reference labels include a numerical portion followed by a latin-letter suffix; reference to only the numerical portion of reference labels is intended to refer collectively to all reference labels that have that numerical portion but different latin-letter suffices.

FIG. 1 provides a schematic diagram presenting an overview of a system in one embodiment of the invention.

DETAILED DESCRIPTION OF THE INVENTION

Figure 1:
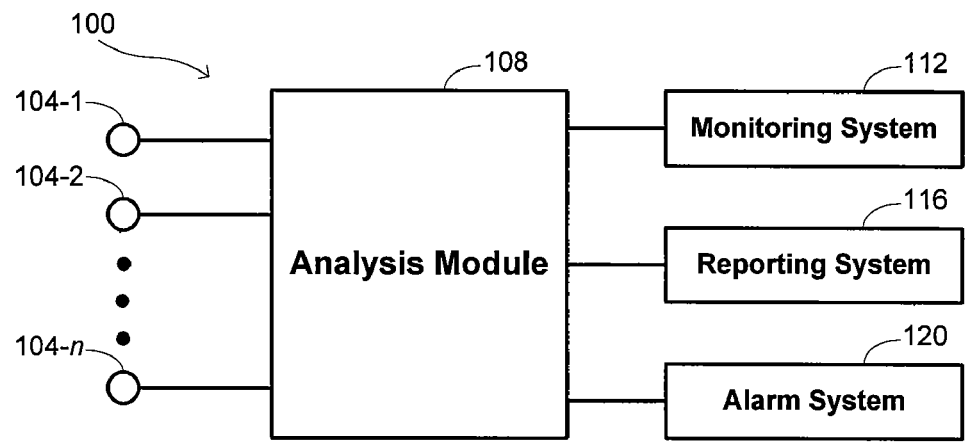

Embodiments of the invention provide methods and systems for managing animal herd populations. While certain embodiments discussed in detail herein refer to livestock populations, the invention may more generally apply in some embodiments to managing other types of animal herds. References herein to a "herd" are thus intended to refer generically to a group of animals that generally feed and travel together, or are generally kept together, although it is recognized that some animals might sometimes leave the herd and other animals might sometimes join the herd. The herd populations may generally be any type of animal, including mammals, birds, and fish. References to "livestock" herds are intended to refer to groups of domesticated animals, many examples of which include animals raised for food, wool, leather, or other human products. For instance, livestock herds might include cattle, sheep, chicken, horses, and the like, while other non-livestock herds might include bison, caribou, bird flocks, and the like. In some instances, the herded nature of livestock is imposed by movement restrictions placed by humans in the form of fences and the like and does not derive from natural behavior of the herded animal.

The current status of a herd of animals may be monitored with embodiments of the invention according to a number of different parameters. Some of these parameters have values for each member of the herd while other parameters are derived parameters that identify a status of the herd as a whole. Merely by way of example, the status of the herd may be defined by the position of each herd member, the body temperature of each herd member, and by other measured properties of each herd member. The status of the herd may also be defined by an average position of the herd calculated as a mean of the position of each herd member, and by dynamic properties of the average position, including its speed and direction of motion over time.

The information used in determining the values of these different types of parameters is collected with a distributed network of sensors that are attached to the herd animals. The physical arrangement of the network is thus dynamic, reflecting the fact that the sensors are generally in motion relative to each other depending on the behavior of the herd animals. The utility of the information collected by each sensor is significantly enhanced by including a capability for peer-to-peer communication among the sensors in forming the network. Information from each of the sensors is aggregated by an analysis module to identify whether there is sufficient evidence of an anomaly in the network. For example, an anomaly might be the result of an ill animal ceasing to move with the herd or by a particular member of the herd straying from the herd. The ability to aggregate information advantageously permits statistical effects to be reduced. The sensors may conveniently be comprised by miniature sensor systems, which may be constructed at relatively low cost and deployed singly or in multiple positions on each animal comprised by the herd. Such miniature sensor systems are a variation of sensor systems sometimes described in the art as "motes."

The invention is not limited to positions on the animals where the sensors are deployed, although certain positions have some advantages for measurement of different types of parameters. Embodiments that deploy multiple sensors on each animal may advantageously collect data for different parameters using different sensors deployed in those locations where the collection of the appropriate data is most convenient. In some instances, a sensor is deployed on the surface of the animal, and may be deployed on the back of the animal's body, on one of the sides of its body, on one of its legs, or on different portions of its head, such as on its ears. In other instances, a sensor is deployed subcutaneously within the animal, and may even be deployed intramuscularly, intravenously, or elsewhere within the body of the animal to collect specialized data.

A general overview of a system of the invention in one embodiment is provided in FIG. 1. An analysis module 108 is equipped to receive data from a plurality of sensors 104 distributed among animals within the herd The type of data collected by the sensors 104 and provided to the analysis module 108 may depend on specific aspects of the system. Interfaced with the analysis module 108 may be monitoring systems 112, reporting systems 116, and/or alarm systems 120. The monitoring systems 112 allow real-time oversight of the state of the herd, with the reporting systems 112 permitting an account of a time evolution of the state to be provided and the alarm systems 120 permitting a notification to be issued upon determination that the herd as a whole or an individual animal within the herd is in a state flagged for identification.

Figure 2:
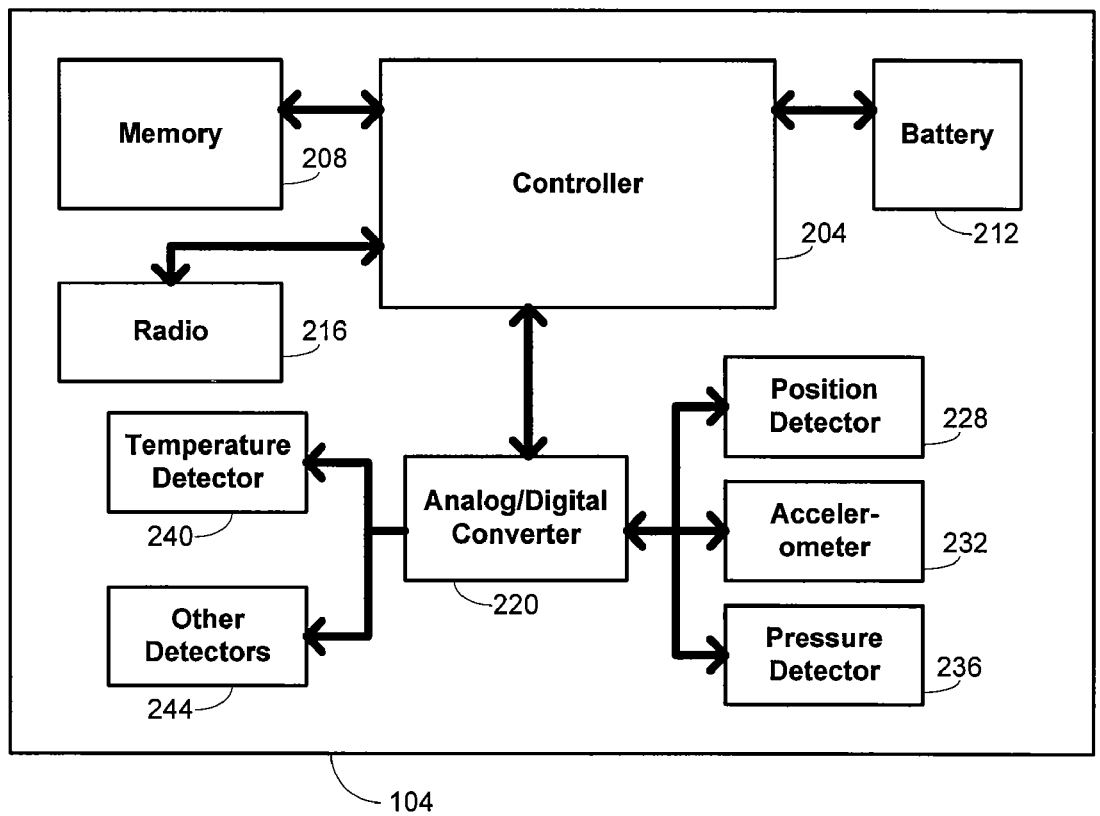
FIG. 2 provides an exemplary structure of a sensor that may be used in embodiments of the invention.

An example of a structure that may be used for the sensors is provided in FIG. 2. In a typical application, the size of the sensor 104 may be on the order of $cm^2$, although the invention is not restricted to a particular size for the sensor, and smaller sensors may be preferred for disposition in some subcutaneous positions. For example, much smaller sensors may be used in other embodiments, having sizes on the order of $mm^2$. Each sensor 104 is generally self-contained, including a microcontroller 204 that coordinates functionality of the sensor 104 and a power source 212 that provides operational power. In some alternative embodiments, the sensor 104 may not include a separate power source but instead have a device for extraction of power from the external environment. For instance, vibration power might be used in some embodiments to power the sensor 104, with power being extracted from the movement imparted by motion of the animal. A memory 208 may store information used by the controller 204, such as programming instructions used by the controller 204 or such as data used by the controller 204 in implementing embodiments of the invention.

The controller 204 is provided in communication with a radio 216, which permits electromagnetic signals to be transmitted and received by the sensor 104, thereby enabling communication with other sensors 104 and establishment of an ad hoc network. Typically, the range of the radio is about 10-400 feet, although embodiments of the invention are not restricted to any particular range, relying only on there being sufficient range that a network may be established. The combination of the radio 216 and controller 204 act as a transceiver that enables peer-to-peer communications to be effected among the sensors 104. This allows each sensor 104 to find other sensors 104 within radio range and create a dynamic network path to a base station. Data from each sensor 104 reaches the base station using this dynamic network path.

The controller 204 is also generally interfaced with a number of detectors, perhaps through an analog-digital converter 220 as appropriate. For example, one detector may comprise a position detector 228 that identifies a position of the sensor 104. In some embodiments, the position identification performed by this detector may be a relative position identification in which a change in position is identified, while in other embodiments an absolute position may be identified, such as by using GPS or similar technology. In many embodiments, changes in position of the sensor 104 are identified by recording its position as determined by the position detector 228 and calculating the difference in position over time. Other embodiments identify position changes more directly by sensing the velocity or acceleration of the sensor 104 with a device like an accelerometer.

Other detection devices that may be comprised by the sensor 104 include a pressure detector 236 and a temperature detector 240. These examples differ in that they are generally expected to be used with sensors 104 in different positions, although there are applications in which they may both be used in a single sensor. In particular, it is generally anticipated that the pressure detector 236 will be used primarily in sensors 104 placed on animals to detect pressure being exerted on the body of the animal, and therefore placed outside the animal's skin or near the surface of the animal's skin. In contrast, sensors 104 that use the temperature detector 240 may more advantageously be positioned deeper in the animal's tissue where they will be less sensitive to ambient air temperature. The identification of specific detectors that may be comprised by the sensor 104 is not intended to be limiting since that are numerous other types of detectors 244 that may be included in other embodiments to detect other parameters.

The type of information that may be collected, and the type of inferences that may be drawn, from position data provided by the sensors 104 is illustrated with FIGS. 3A-3D. These four drawings show a time evolution of the position of 36 different sensors 104, with each of the sensors 104 being disposed on an animal and thereby identifying the position of the animal. As evident from the initial drawing in FIG. 3A for time to, the animals may be grouped as a herd 300. In addition to collecting information individually about the animals, collective properties of the herd 300 may also be determined by the calculation of statistical measures. In this example, the mean position of the animals comprised by the herd 300 is identified with a "+" symbol in the drawing, and the area that defines a one-σ standard deviation from the mean position lies within the dashed line 304. Other statistical measures may be used in other embodiments, including other variance measures.

Figure 3A:
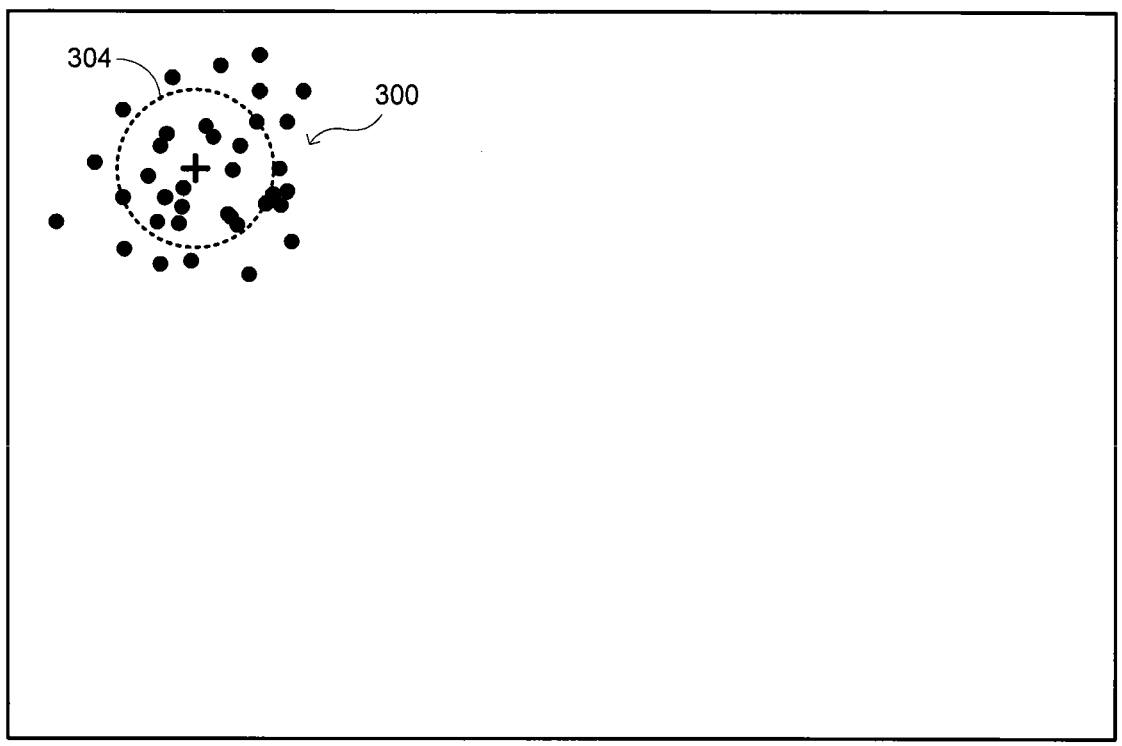
FIGS. 3A-3D provide schematic diagrams illustrating inventory information that may be collected in embodiments of the invention.
Figure 3B:
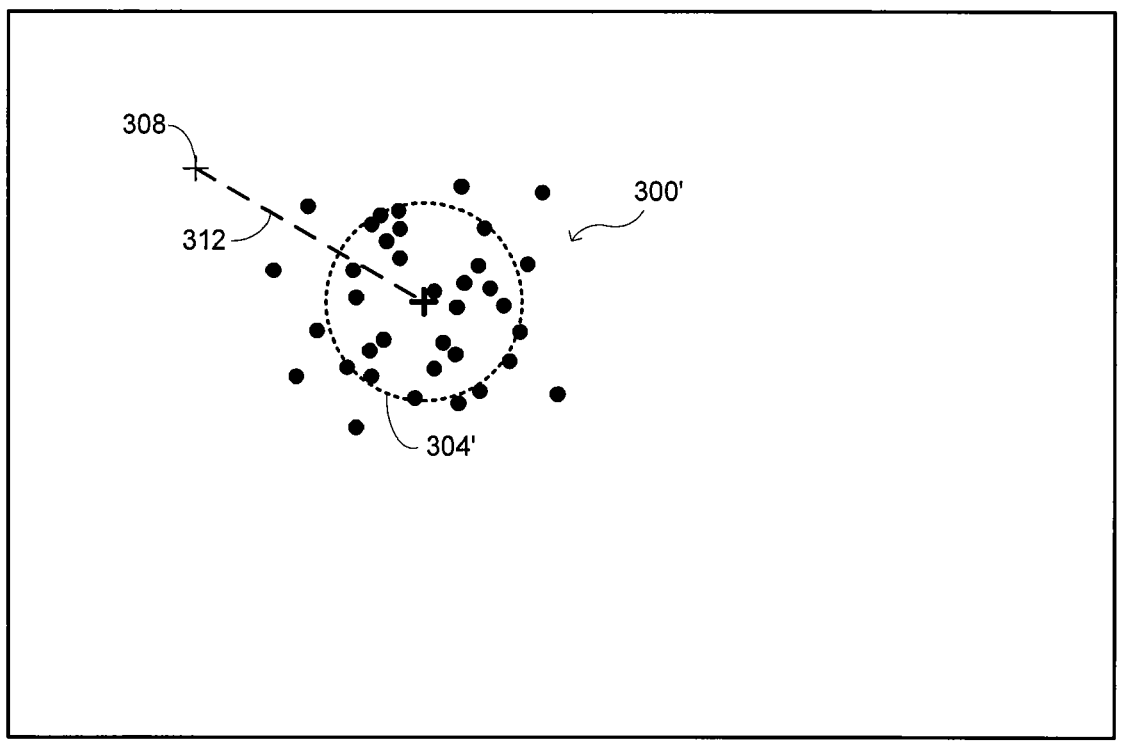

At a later time $t_1$, each of the animals comprised by the herd may have moved, as reflected by the modified positions shown in FIG. 3B. One consequence of the movement is that is that both the mean position of the herd 300' and the one-σ region have changed. The former mean position is designated by element 308 and vector 312 shows how the position has changed between time $t_1$ and $t_2$. The new one-σ region 304' is not only displaced generally in the direction of vector 312, but may also have a different size. In this illustration, the region 304' is larger in FIG. 3B than was the corresponding region 304 in FIG. 3A, reflecting the fact that the herd 300' has become more disperse.

Figure 3C:
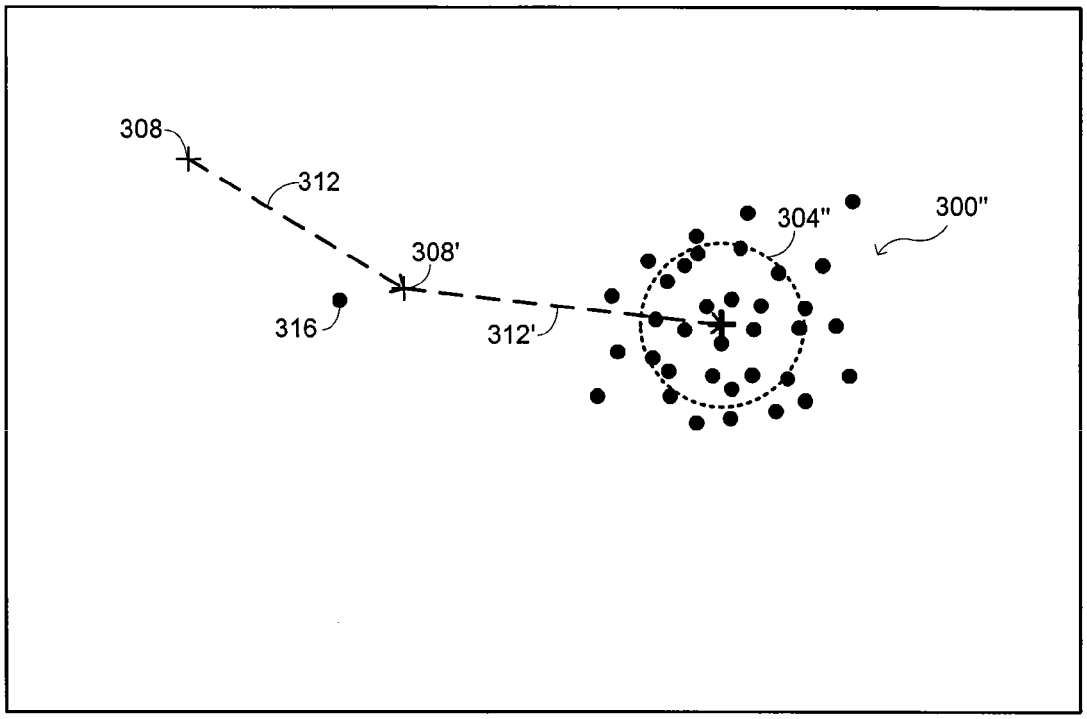

Similar types of changes are also evident in FIG. 3C, which shows positions of the herd 300' at time $t_2$. In this instance, the previous mean position for the herd is denoted by element 308', with vector 312' showing how the mean position has changed between times $t_1$ and $t_2$. In this instance, however, one animal 316 has a position that is substantially unmoved from its position at time $t_1$. The system may identify the position of this animal as anomalous because it lies significantly outside the new one-σ region 304". Identification that the animal appears no longer to be moving with the herd 300' may trigger an alarm to indicate the possibility of an illness in the animal that has caused it to lie down. There are numerous different types of statistical measures that may be used to identify when an animal is separated from the herd by a statistically meaningful distance. For instance, one simple measure uses a Z score in which an animal is identified as separated from the herd when it is more than a predefined number of standard deviations from the mean position, such as by being more than 2σ from the mean, more than 2.5σ from the mean, more than 3σ from the mean, and the like. Other statistical measures for identifying separated animals that may be used in alternative embodiments will be known to those of skill in the art.

Figure 3D:
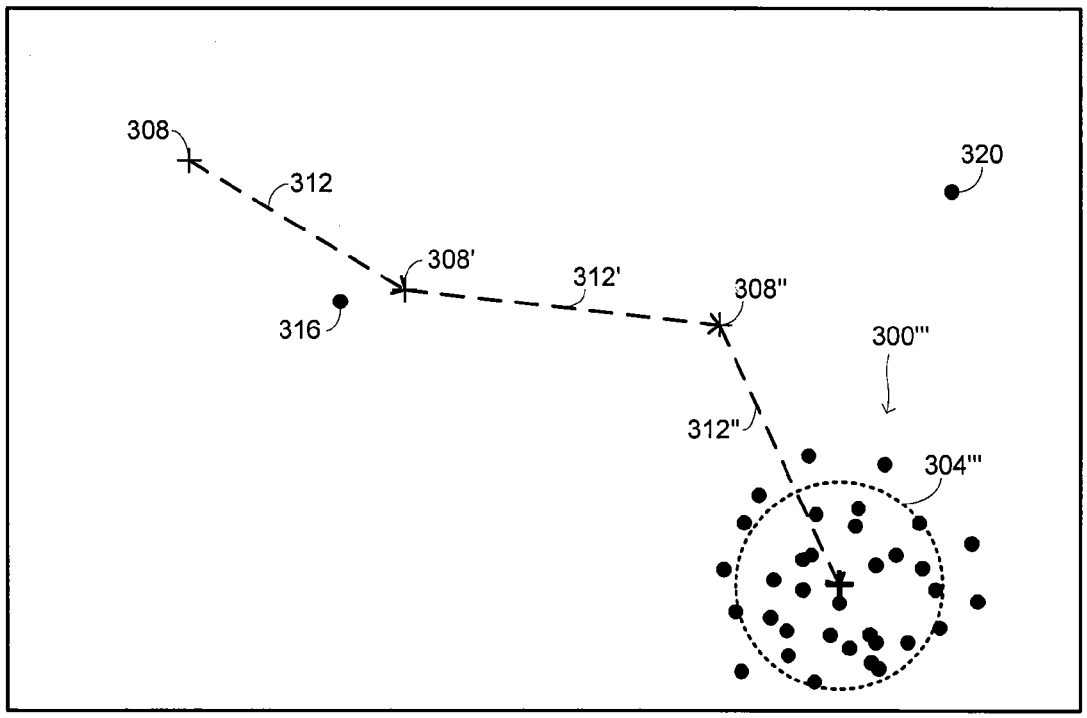

Another example that shows a separation of an animal 320 from the herd is illustrated in FIG. 3D for the herd 300''' at time $t_3$. The change in the herd's position from time $t_2$ is shown by vector 312' originating at the prior herd mean position 308'', with the new one-σ region being denoted by 304'''. In this instance, the position of the separated animal seems not to be consistent with it having failed to move from the last time, but instead appears to reflect that the animal 320 is moving in a different pattern than the herd. The ability to identify animals that have become separated from the herd in this way is useful in tracking their movements.

Figure 4:
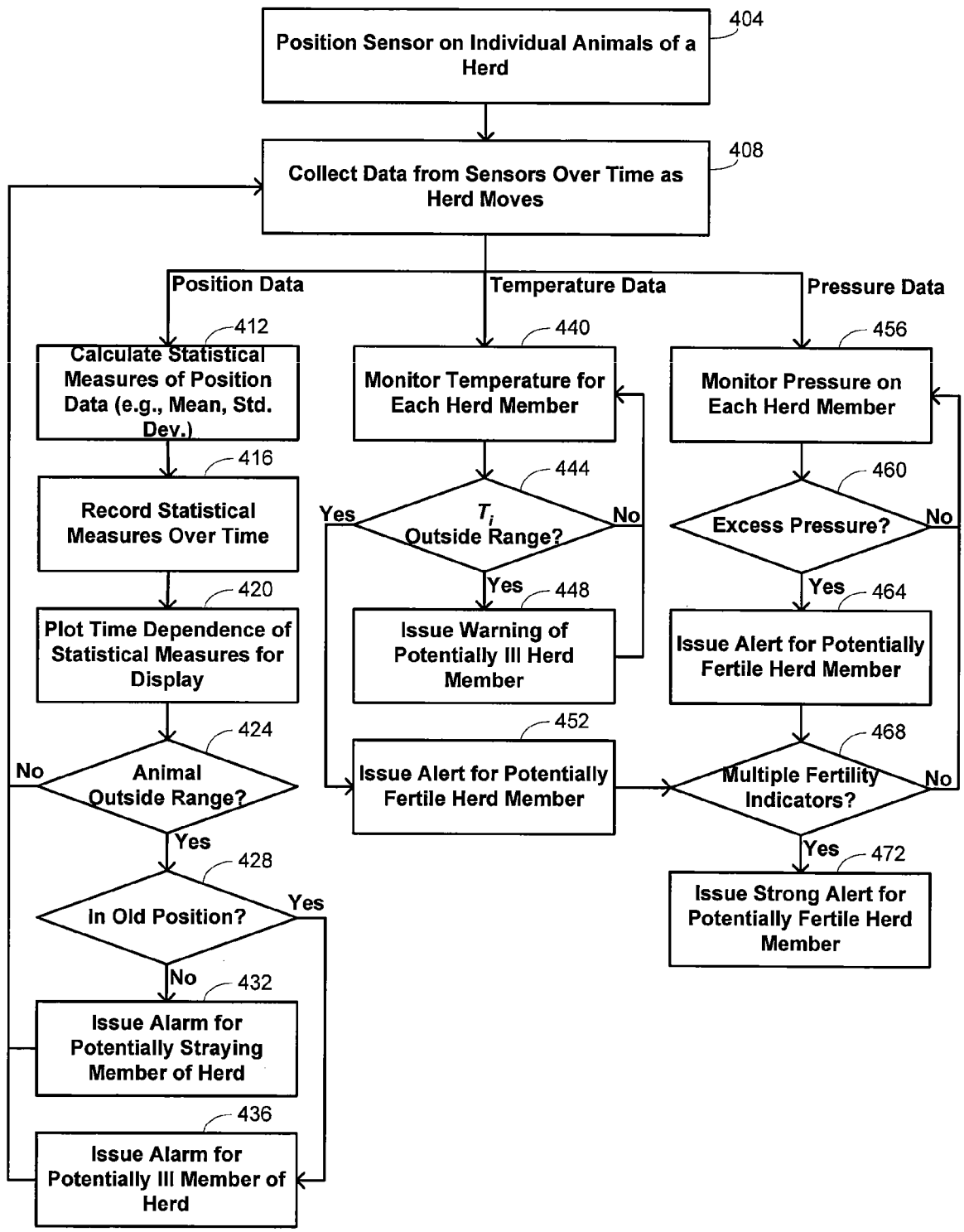
FIG. 4 is a flow diagram illustrating methods of livestock management that may be performed in accordance with the invention.

In addition to the movement information discussed in connection with FIGS. 3A-3D, the sensors 104 may be collecting other types of information that may be used diagnostically in evaluating the state of the herd, either alone or in combination with other measures. FIG. 4 thus provides a flow diagram that summarizes some of the different types of information that may be collected and used diagnostically in evaluating the state of the herd. The method begins generally at block 404 with the sensors 104 being positioned on individual animals of a herd. In some embodiments, each animal may be provided with only a single sensor, although in other embodiments some or all of the animals may be provided with a plurality of sensors 104. Data are collected from the sensors 104 using the different types of detectors as described in connection with FIG. 2 and as indicated at block 408.

The left column of the figure shows processes that may be executed with position data collected by the sensors. At block 412, statistical measures of the data may be calculated to provide an overall characterization of a state of the herd. Such statistical measures may include an average position, such as may be determined by calculation of an unweighted mean, a weighted mean, or similar type of calculation, and may include a position variance, such as may be determined by calculation of a standard deviation or other variance measure. The statistical measures are recorded over time, as indicated at block 416, permitting the time dependence of the statistical measures to be plotted for display at block 420. This information may then be used to determine whether any members of the herd have a position that is seemingly anomalous, allowing an alarm to be issued so that the potential anomaly may be investigated further.

Thus, at block 424, a check is made whether any of the animals is outside of a normal range. Because there is an inherent statistical distribution of members of the herd, this determination may use the statistical measures and apply a known statistical technique. In doing so, different embodiments may implement different confidence levels depending on how quickly a response to a potential anomaly is desired. For instance, in some embodiments, the determination at block 424 may require a 99.9% confidence level that an identified animal is separate from the herd population, while other embodiments might use confidence levels of 99%, 95%, 90%, 85%, 80%, or others. If an animal is determined to be separated from the herd, a check may be made at block 428 whether the position of that animal is consistent with a prior position of the animal or herd. Such a determination may again involve the application of statistical techniques to reflect the fact that the herd generally continues to have been in motion. If the animal is found to be in a prior position, an alarm may be issued at block 436 to indicate a potential illness of that animal. If the animal is instead found to be at a different position, an alarm may issued at block 432 that the animal may be straying from the herd. The issuance of such alarms permits a more detailed investigation to be initiated, such as by recovering the separated animal to rejoin it with the herd or provide it with veterinary attention. The method continues with collecting data from the sensors at block 408.

The center column of FIG. 4 shows processes that may be executed with temperature data collected by the sensors. The temperature of each herd member may be generally monitored, as indicated at block 440, and with a check being made whether any of the temperatures fall outside a normal range. When an animal's temperature is outside a normal range, there may be a number of different causes that are manifested by different temperature ranges and the cause may also depend on a position of the sensor 104 within the animal's body. There are thus a number of different responses that may be initiated when the temperature is outside a predefined range depending on such factors. This includes issuing a warning that a member of the herd is potentially ill at block 448 and issuing an alert that a herd member is in a fertile state at block 452. Irrespective of whether an alert is issued or no meaningful temperature deviation is detected, the method continues with monitoring the temperature for each herd member at block 440.

The right column of FIG. 4 shows processes that may be executed with pressure data collected by the sensors. The pressure detected by each sensor 104 is monitored at block 456 so that a determination may be made at block 460 whether any of the sensors 104 is subject to excess pressure. In embodiments of the invention where the sensors are positioned on animals so that they detect pressure in response to a female animal being mounted, the presence of excess pressure may indicate that the animal is in a state of estrus. An alert is accordingly issued at block 464 to identify that herd member as potentially fertile, allowing action to be taken to confirm the fertile state and to breed the animal.

In many instances, multiple measurements may be combined to improve confidence in a conclusion drawn from the collected data. One such example is indicated in FIG. 4, although numerous other combinations of data may also be used to improve confidence in other embodiments. The example provided in FIG. 4 relates to fertility determinations, with a check being made at block 468 whether multiple indicators identify an animal as potentially fertile, in this case originating with a detection of excess pressure on one of the herd members coupled with a change in temperature consistent with fertility. When such a combination of indicators is present, a stronger alert may sometimes be issued as indicated at block 472 to indicate the greater confidence in the conclusion.

Figure 5:
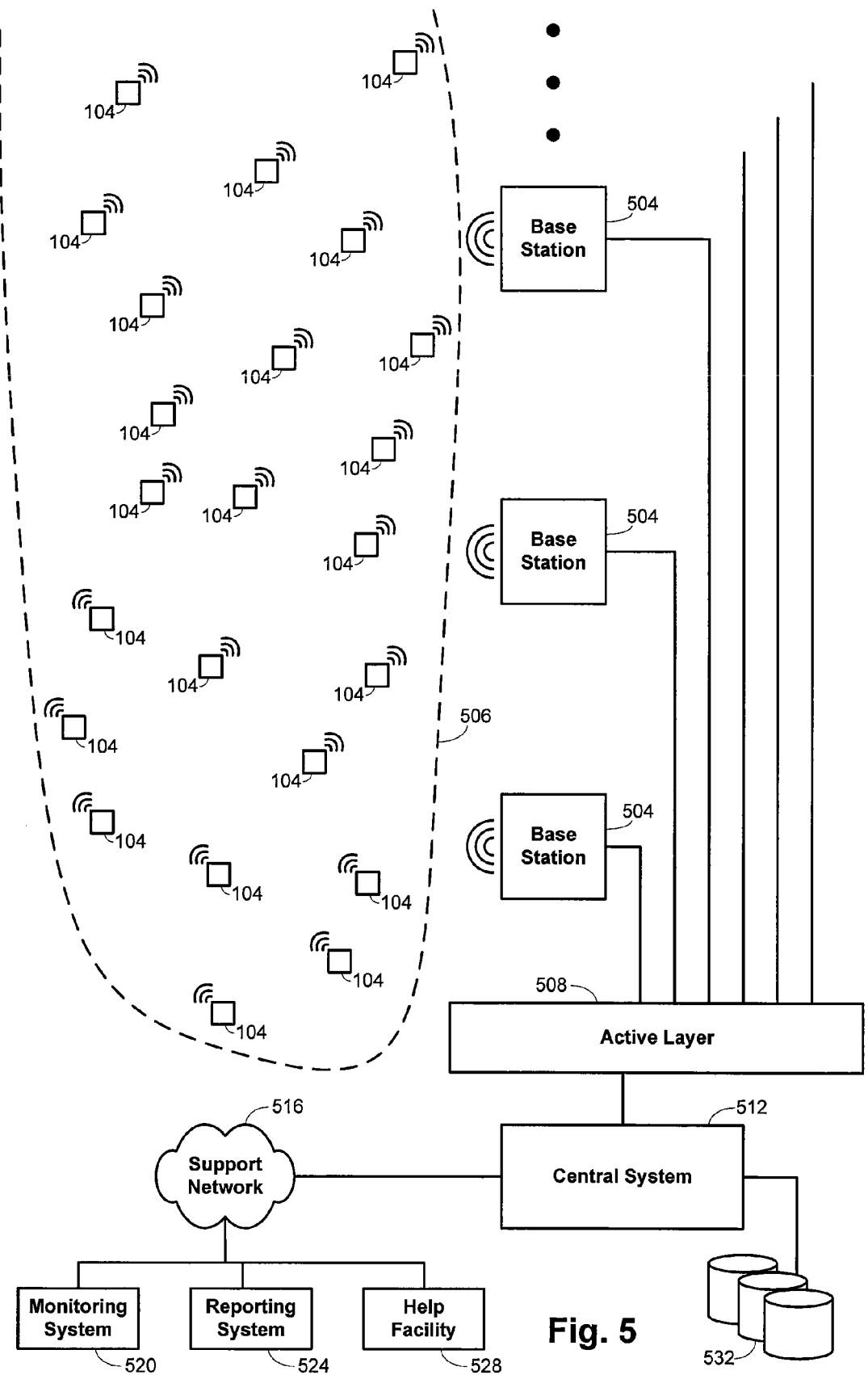
FIG. 5 is a schematic illustration of a structural layout for a monitoring system in embodiments of the invention.

An illustration is provided schematically in FIG. 5 of how information is collected from the herd animals using the sensors 104, and how it is combined in monitoring and evaluating the status of the herd. The distribution of sensors 104 is denoted generally by envelope 506, which is intended to illustrate that the sensors 104 have a physical distribution that corresponds to the distribution of the herd animals and additionally have peer-to-peer communications in forming dynamic network paths. Each sensor 104 generally includes information identifying its location, which it transmits with the data describing other measurements taken by its detectors. Base stations 504 are distributed so that dynamic network paths may be used to access the data being provided by each of the sensors 104. The total amount of data collected clearly depends on the size of the herd and the number of sensors 104 position on each animal within the herd, but is generally expected to be large. An intermediate active layer 508 may be provided to allow both coordination of the information from the different sensors 104 to be performed and to allow a central system 512 to be used in performing monitoring functions, with relevant data being stored for access by the central system 512 on one or more databases 532. The active layer 508 comprises a suite of server and client resident software that enables data collection and event detection in real time in an adaptable fashion, and is described in further detail for other applications in copending U.S. Pat. Appl. Ser. No. 09/871,996, the entire disclosure of which is incorporated herein by reference for all purposes. The active layer 508 also provides a mechanism by which adjusted weighting factors may be backpropagated to the monitoring modules to improve generation of results, such as by modifying required statistical confidence levels. The control system 512 thus acts to perform analyses such as those described above.

The central system 512 may also act as an interface through which additional functionality is provided. For example, support functionality may be provided through a support network 516 that is interfaced with a monitoring system 520 that provides monitoring personnel with conclusions defining a state of the herd derived by the central system 512, a reporting system 524 that generates periodic reports for customers regarding the state of the herd, and a help facility 528 that allows customers access to make inquiries about the results or operation of the system. As part of the support provided, the central system 512 may retain information specifying the pedigree and vital records of each animal in the herd. Furthermore, there are a number of embodiments in which the herd is one several herds that may be monitored simultaneously. For example, a second herd might be monitored using a similar distribution of sensors disposed on animals with peer-to-peer communications capabilities. The monitoring of a plurality of herds may be performed for a single customer or for different customers and may provide information that may be correlated to identify systematic trends across herds. For example, in an instance where a disease has penetrated into a geographical area, the ability to identify which herds show initial signs of affliction as well as to identify those herds that do not show such signs could be used in localizing the spread of the disease and saving at least some herds within that geographical area.

Figure 6:
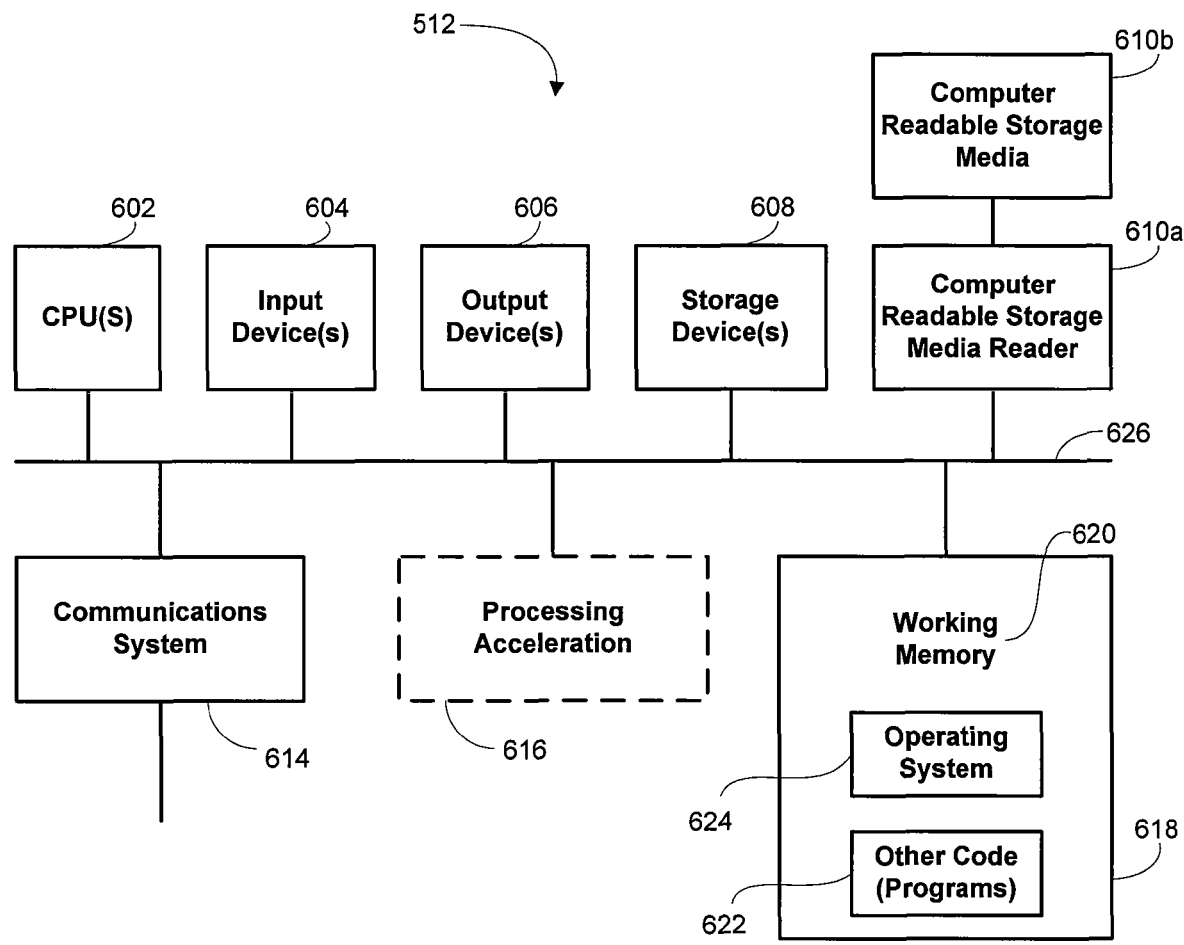
FIG. 6 illustrates a structure that may be used for a computer system on which methods of the invention may be embodied.

FIG. 6 provides a schematic illustration of a structure that may be used to implement the central system 512. FIG. 6 broadly illustrates how individual system elements may be implemented in a separated or more integrated manner. The central system 512 is shown comprised of hardware elements that are electrically coupled via bus 626, including a processor 602, an input device 604, an output device 606, a storage device 608, a computer-readable storage media reader 610a, a communications system 614, a processing acceleration unit 616 such as a DSP or special-purpose processor, and a memory 618. The computer-readable storage media reader 610a is further connected to a computer-readable storage medium 10b, the combination comprehensively representing remote, local, fixed, and/or removable storage devices plus storage media for temporarily and/or more permanently containing computer-readable information. The communications system 614 may comprise a wired, wireless, modem, and/or other type of interfacing connection and permits data to be exchanged with the active layer 508, databases 532, support network 516, and other interfaces that may be used in coordinating processing for other environments.

The central system 512 also comprises software elements, shown as being currently located within working memory 620, including an operating system 624 and other code 622, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A system for monitoring a herd of animals, the system comprising:
    a plurality of sensors, each of the sensors being attached to one of the animals and being in peer-to-peer communication with any other of the sensors to define a dynamically networked arrangement of sensors;
    a base station in communication with at least one of the sensors to access the dynamically networked arrangement of sensors; and
    a central system in communication with the base station and having programming instructions to monitor a position of the herd with data collected by the sensors.

2. The system recited in claim 1 wherein the programming instructions to monitor the position of the herd comprise programming instructions to determine an average position of the animals.

3. The system recited in claim 2 wherein the programming instructions to determine the average position of the animals comprise programming instructions to determine a mean position of the animals.

4. The system recited in claim 2 wherein the programming instructions to monitor the position of the herd further comprise programming instructions to determine a statistical variance of the position of the animals.

5. The system recited in claim 1 wherein the central system further has programming instructions to identify that one or more of the animals has separated from the herd.

6. The system recited in claim 1 wherein:
    at least some of the sensors include a temperature detector; and
    the central system further has programming instructions to monitor temperatures of at least some of the animals with data collected by the sensors.

7. The system recited in claim 1 wherein:
    at least some of the sensors include a pressure detector; and
    the central system further has programming instructions to identify one or more of the animals having pressure exerted on the one or more animals.

8. The system recited in claim 1 wherein multiple sensors are attached to at least some of the animals.

9. The system recited in claim 1 wherein at least one of the sensors is attached subcutaneously to one of the animals.

10. The system recited in claim 1 wherein at least one of the sensors comprises a vibration power source to supply energy to the at least one of the sensors by extracting energy from motion of the animal to which the at least one of the sensors is attached.

11. The system recited in claim 1 wherein the herd of animals is one of a plurality of herds of animals, the system further comprising:
    a second plurality of sensors, each of the second plurality of sensors being attached to one of the animals of a second of the herds and being in peer-to-peer communication with another of the second plurality of sensors to define a second dynamically arrangement of sensors; and
    a second base station in communication with at least one of the second plurality of sensors to access the second dynamically networked arrangement of sensors,
    wherein the central system further has programming instructions to monitor a position of the second of the herds with data collected by the second plurality of sensors.

12. The system recited in claim 1 wherein the herd of animals comprises a domesticated livestock herd.

13. The system recited in claim 1 wherein the herd of animals comprises a wildlife herd.

14. A method for monitoring a herd of animals, the method comprising:
    collecting data from a plurality of sensors, each of the sensors being attached to one of the animals and being in peer-to-peer communication with any other of the sensors to define a dynamically networked arrangement of sensors; and
    monitoring a position of the herd with the data collected by the sensors.

15. The method recited in claim 14 wherein monitoring the position of the herd comprises determining an average position of the animals.

16. The method recited in claim 15 wherein determining the average position of the animals comprises determining a mean position of the animals.

17. The method recited in claim 15 wherein monitoring the position of the herd further comprises determining a statistical variance of the position of the animals.

18. The method recited in claim 14 further comprising identifying that one or more of the animals has separated from the herd.

19. The method recited in claim 14 wherein at least some of the sensors include a temperature detector, the method further comprising monitoring temperatures of at least some of the animals with data collected by the sensors.

20. The method recited in claim 14 wherein at least some of the sensors include a pressure detector, the method further comprising'identifying one or more of the animals having pressure exerted on the one or more animals.

21. The method recited in claim 14 wherein the herd of animals is one of a plurality of herds of animals, the method further comprising:

collecting data from a second plurality of sensors, each of the second plurality of sensors being attached to one of the animals and being in peer-to-peer communication with another of the second plurality of sensors to define a second dynamically networked arrangement of sensors; and monitoring a position of the second herd with the data collected by the second plurality of sensors.

22. The method recited in claim 14 wherein the herd of animals comprises a domesticated livestock herd.

23. The method recited in claim 14 wherein the herd of animals comprises a wildlife herd.

\* \* \* \* \*

UNITED STATES PATENT AND TRADEMARK OFFICE
CERTIFICATE OF CORRECTION

PATENT NO. : 7,918,185 B2
APPLICATION NO. : 11/468111
DATED : April 5, 2011
INVENTOR(S) : M. Sam Araki et al.

Page 1 of 1

It is certified that error appears in the above-identified patent and that said Letters Patent is hereby corrected as shown below:

In the Claims

Claim 11, column 10, line 25, please insert --networked-- after dynamically.

Claim 20, column 10, line 65, please delete "comprising'" and insert --comprising--.

Signed and Sealed this
Second Day of August, 2011

David J. Kappos
*Director of the United States Patent and Trademark Office*